United States Patent [19]
Frischinger et al.

[11] Patent Number: 6,103,825
[45] Date of Patent: Aug. 15, 2000

[54] EPOXY RESIN PRE-ADVANCED WITH CARBOXYL-CONTAINING POLYESTER AND ADVANCED WITH BISPHENOL

[75] Inventors: Isabelle Frischinger, Riespach, France; Jürgen Finter, Freiburg, Germany; Christine Poget, Blonay, Switzerland; Philippe-Guilhaume Gottis, Mulhouse, France

[73] Assignee: Ciba Specialty Chemicals Corp., Tarrytown, N.Y.

[21] Appl. No.: 09/070,662

[22] Filed: Apr. 30, 1998

[30] Foreign Application Priority Data

May 6, 1997 [CH] Switzerland ............................. 1056/97

[51] Int. Cl.$^7$ .......................... C08G 59/14; C08L 33/02; C08L 67/03; C08L 63/02
[52] U.S. Cl. .......................... 525/119; 525/438; 525/524; 525/533
[58] Field of Search ..................................... 525/438, 533, 525/524, 119, 934

[56] References Cited

U.S. PATENT DOCUMENTS

| | | | |
|---|---|---|---|
| 3,397,254 | 8/1968 | Wynstra et al. | 260/835 |
| 3,979,477 | 9/1976 | Schmid et al. | 525/438 |
| 3,985,825 | 10/1976 | Schmid et al. | 525/908 |
| 4,421,897 | 12/1983 | Gutekunst | 525/119 |
| 5,019,639 | 5/1991 | Hofer et al. | 528/94 |
| 5,095,050 | 3/1992 | Treybig et al. | 523/103 |
| 5,294,683 | 3/1994 | Cotting et al. | 525/524 |

FOREIGN PATENT DOCUMENTS

| | | |
|---|---|---|
| 0129191 | 12/1984 | European Pat. Off. . |
| 0503865 | 9/1992 | European Pat. Off. . |
| 0536085 | 4/1993 | European Pat. Off. . |
| 0600546 | 6/1994 | European Pat. Off. . |
| 1182728 | 5/1975 | United Kingdom . |
| 1183434 | 12/1975 | United Kingdom . |

*Primary Examiner*—Robert E. Sellers
*Attorney, Agent, or Firm*—David R. Crichton; Michele A. Kovaleski

[57] ABSTRACT

Epoxy resins which are obtainable by a process in which, first of all (a) by reacting
  (A1) at least one substance selected from the substances of the formula (I) and of the formula (II):

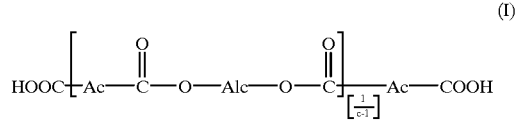

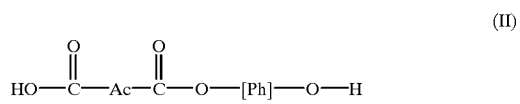

in which
  Alc is the radical of a diol which has been freed from Its hydroxyl groups and comprises 2 to 20 carbon atoms,
  Ac is the radical of a dicarboxylic acid which has been freed from its carboxyl groups and comprises 2 to 20 carbon atoms,
  [Ph] is the radical of a difunctional phenolic compound which has been freed from its phenolic hydroxyl groups and has 6 to 20 carbon atoms, and
  c is a number greater than 1 but not more than 2, with
  (A2) at least one liquid diglycidyl ether based on a first bisphenol compound in an amount chosen so that there are more than two equivalents of glycidyl groups of component (A2) for a total of one equivalent of carboxyl and phenolic hydroxyl groups of component (A1),
  a pre-advanced diglycidyl ether resin is formed in dispersion in the liquid diglycidyl ether of which there is at least one, and subsequently
(b) the resin dispersion obtained in accordance with (a) is reacted with a phenol component comprising at least one bisphenol compound which is identical to or different from the first bisphenol compound, the amount of the phenol component being chosen so that in the mixture of the resin dispersion and the phenol component the glycidyl groups prior to the reaction are in a stoichiometric excess over the phenolic hydroxyl groups.

8 Claims, No Drawings

EPOXY RESIN PRE-ADVANCED WITH CARBOXYL-CONTAINING POLYESTER AND ADVANCED WITH BISPHENOL

The present invention relates to an epoxy resin which has been modified in a new way and is based on a conventional liquid bisphenol diglycidyl ether, to its use as a component of heat-curable compositions, especially powder coating materials, and to the corresponding heat-curable compositions and powder coating materials.

As is known, the aim of modifying conventional epoxy resins is to provide epoxy resins which although based on commercially customary components possess special properties and/or performance advantages. A known example of such modification is the preparation of solid diglycidyl ethers by advancement, i.e. by extension of the molecular chain, of a liquid diglycidyl ether based on a first bisphenol HO—[BPh]$^1$-OH, by reacting a stoichiometric excess of this liquid base diglycidyl ether with a bisphenol compound HO—[BPh]$^2$-OH, which may be identical to or different from the bisphenol compound HO—[BPh]$^1$-OH, in accordance with the following reaction scheme:

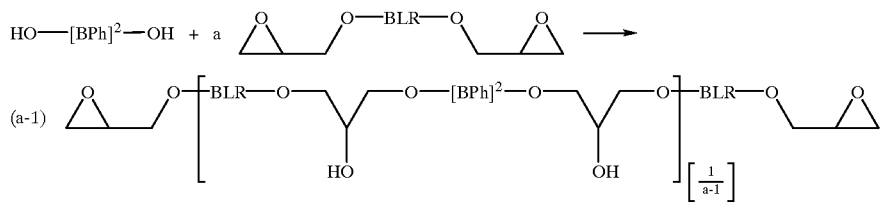

In this scheme

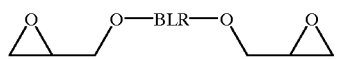

is the liquid base diglycidyl ether, with BLR being a group of the chemical formula:

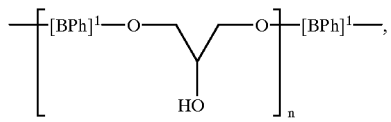

in which n is a number from 0 to 0.3, which corresponds to the average number of structural repeating units —[BPh]$^1$OCH$_2$CH(OH)CH$_2$O— in the molecules of the base diglycidyl ether, and a is a number greater than 1, for example 1.1 or more.

Like the index n, the quotient [1/(a−1)] is an average for the totality of all molecules of the respective resin and may therefore also be a fraction if the resin is polydisperse, in other words if it is present as a mixture of molecules of different chain length.

The upper limit for the parameter a is judiciously 2. If a is greater than 2, mixtures of advanced and non-advanced diglycidyl ethers are obtained, since in this case, in the absence of further co-reactants, that proportion of the liquid base epoxy resin that exceeds double the bisphenol content remains unreacted.

An epoxy resin modified in a way more complex than that depicted above is described in EP-A-0 129 191. The first step in preparing this resin, as in the above equation, is to react a liquid bisphenol A diglycidyl ether with bisphenol A to give an advanced epoxy resin which then, again in a stoichiometric excess, is reacted with a carboxyl-terminated polymer HOOC-Pol-COOH which is liquid at room temperature, for example with a carboxyl-terminated poly (ethyl acrylate) or, preferably, with a carboxyl-terminated poly(butadiene-acrylonitrile), in accordance with the reaction scheme below:

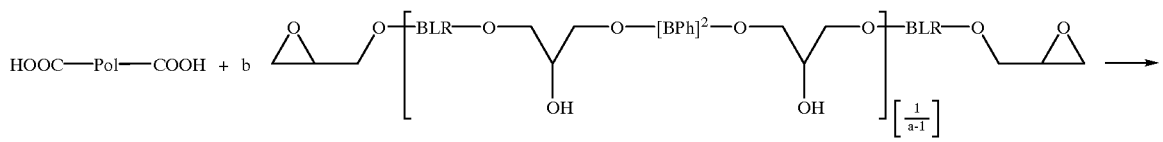

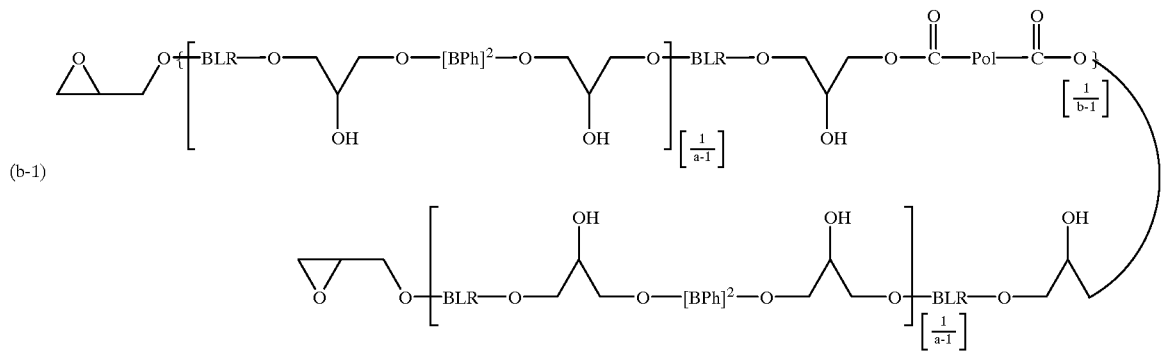

In this reaction scheme the index b is a number greater than 1, while the other symbols are as defined above and both $[BPh]^1$ and $[BPh]^2$ are a group derived from bisphenol A by removing both hydroxyl groups. According to the teaching of EP-A-0 129 191, the resins obtained are used for enhancing the adhesiveness and impact strength of coating and adhesive mixtures.

The present invention likewise provides a modified epoxy resin, specifically an epoxy resin obtainable by a process in which first of all, (a) by reacting
(A1) at least one substance selected from the substances of the formula (I) and of the formula (II):

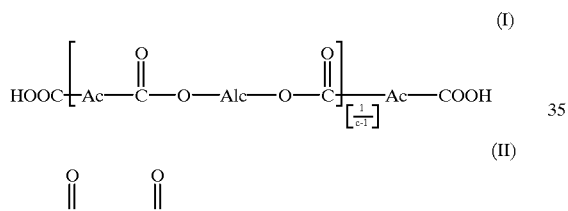

in which
Alc is the radical of a diol which has been freed from its hydroxyl groups and comprises 2 to 20 carbon atoms,
Ac is the radical of a dicarboxylic acid which has been freed from its carboxyl groups and comprises 2 to 20 carbon atoms,
[Ph] is the radical of a difuncfional phenolic compound which has been freed from its phenolic hydroxyl groups and has 6 to 20 carbon atoms, and
c is a number greater than 1 but not more than 2, with (A2) at least one liquid diglycidyl ether based on a first bisphenol compound in an amount chosen so that there are more than two equivalents of glycidyl groups of component (A2) for a total of one equivalent of carboxyl and phenolic hydroxyl groups of component (A1),
a pre-advanced diglycidyl ether resin is formed in dispersion in the liquid diglycidyl ether of which there is at least one, and subsequently (b) the resin dispersion obtained in accordance with (a) is reacted with a phenol component comprising at least one bisphenol compound which is identical to or different from the first bisphenol compound, the amount of the phenol component being chosen so that in the mixture of the resin dispersion and the phenol component the glycidyl groups prior to the reaction are in a stoichiometric excess over the phenolic hydroxyl groups.

The excess of glycidyl equivalents of component (A2) in relation to carboxyl equivalents of component (A1) or, in the case where substances of the formula (II) are present, in relation to the sum of carboxyl and hydroxyl equivalents of component (A1) in step (a) is preferably up to 1500 percent, in particular from 150 to 400 percent. In step (b) the amount of the phenol component is judiciously chosen so that in the reaction mixture prior to the reaction the glycidyl groups are present in an excess of from 1.5 to 2.5 times, preferably from 1.8 to 2.2 times and, with very particular preference, about 2 times the amount of the phenolic hydroxyl groups.

The preparation of the epoxy resin modified in accordance with the invention proceeds in accordance with the following, idealized reaction scheme:

Stage (a):

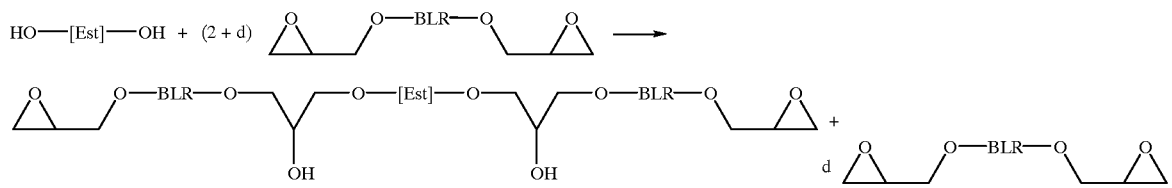

Stage (b):

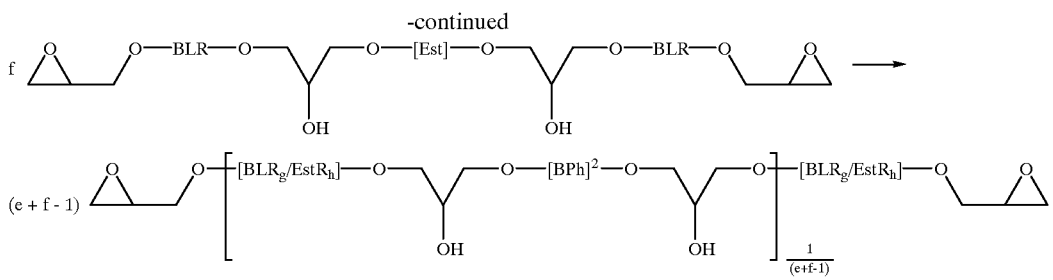

In this reaction scheme:

[BPh]² is the radical of a bisphenol compound without its phenolic hydroxyl groups;

[Est] is a group of one of the following two formulae:

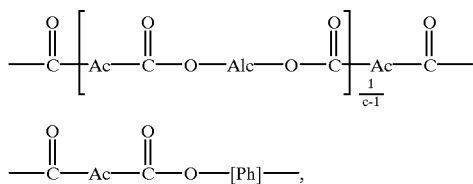

in which Ac, Alc, [Ph], and c are as defined above;
BLR is a group of the following formula:

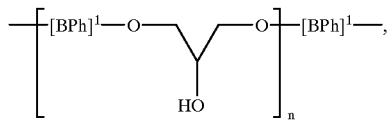

in which [BPh]³ is the radical of a bisphenol compound without its phenolic hydroxyl groups and n is a number from 0 to 0.3, preferably from 0 to 0.2;

EstR is a group of the following formula:

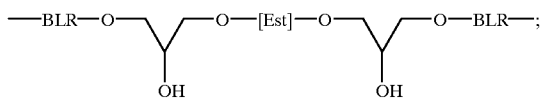

d is a number greater than zero;
e is a number greater than or equal to d;
f is a number greater than zero;
g is the quotient $[e/(e+f)]$; and
h is the quotient $[f/(e+f)]$.

The symbol $[BLR_g/EstR_h]$ is intended to make it clear that the g-th part of the groups identified by $[BLR_g/EstR_h]$ comprises BLR groups and the h-th part comprises EstR groups, the distribution of the BLR and EstR groups in the molecules of the epoxy resin modified in accordance with the invention being random.

In practice the sum (e+f) in stage (b) of the above scheme is from about 1.5 to 2.5, preferably from 1.8 to 2.2 and, in particular, about 2. A small part of the total amount of epoxy resin used in stage (b) may also remain unreacted. The quotient (e/f) in the above reaction scheme is in practice generally from 1:25 to 25:1, preferably from 1:10 to 10:1 and, in particular, from 1:5 to 5:1.

These epoxy resins have a surprisingly low intrinsic viscosity and can therefore be used to produce coating compositions having a particularly low melt viscosity and hence, inter alia, particularly good levelling, in order, for example, to produce corresponding powder coating materials.

In accordance with the invention, preference is given to epoxy resins wherein

Alc is the radical, freed from its hydroxyl groups, of a diol selected from straight- or branched-chain diols having 2 to 6 carbon atoms, diols having 6 to 20 carbon atoms and containing one or more cycloaliphatic groups, and diols having 6 to 20 carbon atoms and containing one or more aromatic groups;

Ac is the radical, freed from its carboxyl groups, of a dicarboxylic acid selected from divalent straight- or branched-chain aliphatic radicals having 2 to 18 carbon atoms, radicals having 6 to 20 carbon atoms and containing one or more cycloaliphatic groups, and radicals having 6 to 20 carbon atoms and containing one or more aromatic groups, and

[Ph] is the radical, freed from its phenolic hydroxyl groups, of a difunctional phenolic compound having 6 to 20 carbon atoms.

Examples of preferred diols from which the group Alc can be derived include glycol, propylene glycol (1,2-propanediol), 1,3-propanediol, 1,2-butanediol, 1,3-butanediol, 1,4-butanediol, neopentyl glycol (2,2-dimethyl-1,3-propanediol), 1,6-hexanediol, 2,5-hexanediol, diethylene glycol, dipropylene glycol, 1,4-cyclohexanediol, 1,4-dimethylolcyclohexane, hydrogenated bisphenol A (2,2-bis-(4-hydroxycyclohexyl)propane), bisphenol A, bisphenol F, hydrogenated bisphenol F (bis-(4-hydroxycyclohexyl) methane) and 2,2-bis[4-(2-hydroxyethoxy)phenyl]propane.

Examples of preferred dicarboxylic acids from which the group Ac can be derived include succinic acid, glutaric acid, adipic acid, pimelic acid, suberic acid, azelaic acid, sebacic acid, decanedicarboxylic acid, fumaric acid, maleic acid, isophthalic acid, terephthalic acid, phthalic acid, 2,5-dichlorophthalic acid, tetrachlorophthalic acid, alkylphthalic acids, especially methylphthalic acids, such as 2,5-dimethylphthalic acid, tetrahydrophthalic acid, methyltetrahydrophthalic acids, for example 4-methyltetrahydrophthalic acid, cyclohexanedicarboxylic acids, for example hexahydrophthalic acid, methylhexahydrophthalic acid, hexahydroisophthalic acid and hexahydroterephthalic acid, endomethylenehexahydrophthalic acid, 2,6-naphthalenedicarboxylic acid, 2,3-naphthalenedicarboxylic acid, 1,8-naphthylenedicarboxylic acid, 4,4'-oxodibenzoic acid, 4,4'-biphenyldicarboxylic acid, 2,2'-biphenylcarboxylic acid, o-, m- or p-phenylenediacetic acid, thiophene-2,5-dicarboxylic acid, furan-2,5-dicarboxylic acid, furan-3,4-dicarboxylic acid and pyrazine-3,4-dicarboxylic acid.

Examples of preferred difunctional phenolic compounds from which the group [Ph] can be derived are 4,4'-diphenol, 2,2'-diphenol, bisphenol A, bisphenol F, and 4,4'-oxodiphenol.

Particular preference is given to epoxy resins of the invention wherein component (A1) is a compound of the formula (I), especially if Alc corresponds to a radical selected from the group consisting of the $C_2$–$C_6$alkanediyl radicals, especially a neopentanediyl radical, and of diols having 6 to 10 carbon atoms and comprising a cyclohexane ring, and Ac corresponds to a cyclohexanediyl radical.

The bisphenol-based diglycidyl ether added in stage (a) is a diglycidyl ether which is liquid at room temperature (15–35° C.) and is based preferably on bisphenol A, bisphenol F or mixtures of the bisphenol compounds stated. It is of course also possible to employ mixtures of two or more different diglycidyl ethers.

The phenol component added in stage (b) of the process for preparing epoxy resins according to the invention also comprises as its bisphenol compound preferably bisphenol A, bisphenol F or a mixture of these two bisphenol compounds.

Judiciously at least stage (b) of the reaction by which the epoxy resins of the invention are obtainable takes place in the presence of a customary advancement catalyst. Suitable catalysts are described, for example, in the U.S. Pat. No. 5,095,050, the disclosure content of which is expressly incorporated herein by reference. Preferred examples of catalysts are tertiary amines, such as triethylamine, tripropylamine, tributylamine, 2-methylimidazole, 2-phenylimidazole, N-methylmorpholine and N-ethyl-N-methylpiperidinium iodide, quaternary ammonium compounds and alkali metal hydroxides. Combinations of different catalysts can also be employed. The catalysts are employed in customary catalytic amounts; for example, in amounts of from 0.0001 to 10 percent by weight, based on the epoxy resin. The reaction temperatures are preferably from 80 to 200° C., in particular from 130 to 200° C.

The phenol component added in stage (b) may additionally include a monophenol. This is particularly advantageous when especially good levelling behaviour is desired and slightly lower values can be accepted for the mechanical properties. The average epoxide functionality ($f_{(AvaH)}$), i.e. the theoretical number of epoxide groups possessed on average by one molecule of an epoxy resin of the invention that has been advanced using monophenol, should preferably be greater than 1.4. The molar amount of monophenol, $MM_{(MoPh)}$, required to prepare an epoxy resin of the invention having a particular average epoxide functionality can be calculated with the aid of the following equation:

$$MM_{(MoPh)} = d \cdot (1 - 0.5 \cdot f_{(AvaH)})$$

in which d is the difference between the number of epoxide equivalents, which corresponds to the amount of epoxy resin dispersion employed for the advancement, and the number of hydroxyl equivalents, which corresponds to the amount of bisphenol compound employed in that context. Particularly preferred monophenols are phenols having one or more, for example two, $C_1$–$C_{12}$alkyl substituents or one $C_6$–$C_{10}$aryl substituent, examples being ethyl, n-propyl, isopropyl, n-butyl, isobutyl, sec-butyl, tert-butyl, n-pentyl, isopentyl, tert-pentyl, neopentyl, n-hexyl, isohexyl, corresponding heptyl or octyl substituents, especially tert-octyl, nonyl, dodecyl or phenyl. Particular preference is given to mono-$C_1$–$C_8$alkylphenols, especially mono-$C_3$–$C_8$alkylphenols, in particular the corresponding para-alkylphenols, and to p-phenylphenol. Further suitable monophenols are described in the U.S. Pat. No. 5,095,050.

The epoxy resins of the invention are a useful formulating component for heat-curable compositions. They can be combined with all customary crosslinking agents or hardeners for epoxy resins. The present invention additionally provides heat-curable compositions comprising an epoxy resin as described above and a substance which reacts with the epoxide groups of the epoxy resin to form a network; for example, a customary hardener for epoxy resins. Hardeners for epoxy resins, such as dicyandiamide, are familiar to the skilled worked and are widely described in the literature. For a general overview reference may be made, for example, to Lee Neville "Handbook of Epoxy Resins", McGraw Hill Book Company 1982.

In many cases it can be judicious to employ curable compositions based on a mixture of the epoxy resins of the invention with other, conventional epoxy resins. In many cases indeed it is impossible to avoid doing so, since such epoxy resins are also present in customary commercial additives. The addition of epoxy resins whose average epoxide functionality is greater than 2, i.e. of epoxy resins which have on average more than 2 epoxide groups per molecule, can be advantageous, for example, when it appears desirable to increase the crosslinking density of the cured material in order, for example, to obtain particularly good mechanical properties. Examples of such epoxy resins are triglycidyl isocyanurate; triglycidyl trimellitate; triglycidyl hexahydrotrimellitate; solid mixed phases comprising a first component selected from diglycidyl trimellitate, triglycidyl hexahydrotrimellitate and mixtures of these two constituents and a second component selected from diglycidyl terephthalate, diglycidyl hexahydroterephthalate and mixtures of these two constituents; and, in particular, epoxy phenol novolaks and epoxy cresol novolaks. The abovementioned solid mixed phases based on at least one epoxy resin component that is solid at room temperature and at least one such component that is liquid at room temperature, and their preparation, are described in more detail in, for example, EP-A-0 536 085.

A particular embodiment of the curable compositions of the invention is represented by hybrid systems, which comprise not only the epoxy resin of the invention but also a further polymer selected from (meth)acrylate polymers containing free carboxyl groups and polyester polymers containing free carboxyl groups.

In such systems the (meth)acrylate polymer is preferably a copolymer of one or more esters of acrylic and/or methacrylic acid, preferably the corresponding alkyl esters having 1 to 18, especially 1 to 8, carbon atoms in the alkyl group, with acrylic acid and/or methacrylic acid, with or without further ethylenically unsaturated comonomers, and has, for example, a molecular weight (numerical average Mn from GPC measurement with polystyrene calibration) of from 500 to 10,000, preferably from 1000 to 10,000. It also contains preferably from 0.2 to 6 equivalents of free carboxyl groups. The glass transition temperature of the (meth) acrylate polymers is judiciously above 20° C. and is preferably from 30 to 100° C. Examples of suitable (meth) acrylic ester monomers are ethyl acrylate, butyl acrylate, 2-ethylhexyl acrylate and especially $C_1$–$C_4$alkyl methacrylates, such as methyl methacrylate, ethyl methacrylate or butyl methacrylate. (Meth)acrylate derivatives containing silane groups may likewise be employed. Examples of suitable ethylenically unsaturated comonomers are acrylo- or methacrylonitriles and also vinyl compounds. Preferred comonomers are vinylaromatic compounds, especially styrene. The abovementioned polymers can be prepared conventionally, for example by polymerizing the monomers in solution in appropriate organic solvents, especially in toluene or in mixtures of 1-methoxy-2-propanol, 1-methoxy-2-propyl acetate and methyl isobutyl ketone (in a weight ratio of 70/20/10, for example), in the presence of an appropriate initiator, such as dicumyl peroxide, and of a chain transfer reagent, such as thioglycolic acid.

The carboxyl-containing polyester polymers preferably have an acid number (stated in mg of KOH/g of polyester) of from 10 to 100 and a molecular weight (numerical average Mn) of from 2000 to 10,000. The ratio of Mw (weight-average molecular weight) to Mn in these polyesters is generally between 2 and 10. The polyesters are judiciously solid at room temperature and preferably have a glass transition temperature of from 35 to 120° C., preferably from 40 to 80° C. Polyesters like these are known, for example, from U.S. Pat. No. 3,397,254 or from EP-A-0 600 546, the disclosure content of which is expressly incorporated herein by reference. They are condensation products of polyols with dicarboxylic acids, with or without polyfunctional carboxylic acids, or the corresponding carboxylic anhydrides. Examples of suitable polyols are ethylene glycol, diethylene glycol, the propylene glycols, butylene glycol, 1,3-butanediol, 1,4-butanediol, neopentanediol, isopentyl glycol, 1,6-hexanediol, glycerol, hexanetriol, trimethylolethane, trimethylolpropane, erythritol, pentaerythritol, cyclohexanediol or 1,4-dimethylolcyclohexane. Examples of suitable dicarboxylic acids are isophthalic acid, terephthalic acid, phthalic acid, methylphthalic acid, tetrahydrophthalic acid, methyltetrahydrophthalic acids, e.g. 4-methyltetrahydrophthalic acid, cyclohexanedicarboxylic acids, succinic acid, glutaric acid, adipic acid, pimelic acid, suberic acid, azelaic acid, sebacic acid, dodecanedicarboxylic acid, fumaric acid, maleic add or 4,4'-biphenyldicarboxylic acid, etc. Examples of suitable tricarboxylic acids are aliphatic tricarboxylic acids, such as 1,2,3-propanetricarboxylic acid, aromatic tricarboxylic acids, such as trimesic acid, trimellitic acid and hemimellitic acid, or cycloaliphatic tricarboxylic acids, such as 6-methyl-cyclohex-4-ene-1,2,3-tricarboxylic acid. Examples of suitable tetracarboxylic acids are pyromellitic acid or benzophenone-3,3',4,4'-tetracarboxylic acid. Commercially available polyesters are frequently based on neopentyl glycol and/or trimethylolpropane as main alcohol constituents and on adipic acid and/or terephthalic and/or isophthalic acid and/or trimellitic acid as main acid components.

The content of epoxy resin and other polymer in the abovementioned compositions is preferably such that the ratio of free carboxyl groups to epoxide groups in the composition lies between 0.5:1 and 2:1, preferably between 0.8:1 and 1.2:1 and, in particular, at approximately 1:1.

The compositions according to the invention may also include further constituents, examples being catalysts and/or accelerators, such as Actiron® NXJ-60 (2-propylimidazole), Actiron® NXJ-60 P (60% by weight 2-propylimidazole on 40% by weight solid carrier material), Beschleuniger® DT 3126 ($[C_{16}H_{33}N(CH_3)_3]^+Br^-$(accelerator)) or triphenylphosphine, in order to permit a sufficiently rapid curing reaction even at relatively low temperatures in the range, for example, of from 60 to 160° C., such as a catalyst for accelerating the thermal reaction of epoxide and carboxyl groups. These catalysts frequently comprise an organic amine or a derivative of an amine, especially a tertiary amine or a nitrogen-containing heterocyclic compound. Preferred a catalysts of the reaction of epoxide with carboxyl groups are phenylimidazole, N-benzyldimethylamine and 1,8-diazabicyclo[5.4.0]-7-undecene, unsupported or on a silicate carrier material. The catalyst or a catalyst mixture is judiciously added in an amount of from about 0.1 to 10, in particular from 0.5 to 5, percent by weight.

The curable compositions of the invention can additionally comprise further customary additives, examples being light stabilizers, dyes, pigments, e.g. titanium dioxide, devolatilizing agents, e.g. benzoin, tackifiers, thixotropic agents and/or levelling agents. The curable compositions of the invention may also include a suitable inert solvent or solvent mixture, for example a xylene, butyl acetate, isobutanol, 1-methoxy-2-propanol, 1-methoxy-2-propyl acetate or methyl isobutyl ketone (MIBK).

The curable compositions of the invention can be employed in the industrial fields customary for curable epoxy resin compositions; in other words, for example, as a coating material, casting resin, impregnating resin, laminating resin, adhesive or sealant.

A particularly preferred field of use for the compositions according to the invention is that of powder coating technology. Hence the invention also provides a powder coating material which consists of one of the above-described solvent-free curable compositions, especially one of the abovementioned hybrid systems in solvent-free form comprising not only an epoxy resin of the invention but also a polymer selected from (meth)acrylate polymers containing free carboxyl groups and from polyester polymers containing free carboxyl groups, with the powder coating composition in particular comprising the polymer that contains free carboxyl groups and the epoxy resin in total in one of the weight ratios 70±5 to 30±5, 60±5 to 40±5 or 50±5 to 50±5.

In powder coating materials the low melt viscosity of the epoxy resins of the invention is evident to particular advantage since it leads to particularly good levelling behaviour of the powder coating materials and hence to the formation of particularly smooth powder coated surfaces. With powder coating materials of the invention comprising an epoxy resin of the invention in whose preparation a phenol component based only on bisphenol compounds is used in stage (b), and/or comprising an epoxy resin of the invention together with at least one epoxy resin which has an average epoxide functionality of greater than 2, moreover, particularly good mechanical properties are obtained as well as the very good levelling behaviour.

EXAMPLE 1

(A) Preparing a compound of the formula (I) by reacting neopentyl glycol with hexahydrophthalic anhydride.

In a reaction vessel with mechanical stirrer, nitrogen blanketing and thermometer, 770.9 g (5 mol) of cis-hexahydrophthalic anhydride are heated under nitrogen to a temperature of 100° C. 260.4 g (2.5 mol) of neopentyl glycol are added over the course of 10 minutes. The reaction temperature is raised to 130° C. and the mixture is left at this temperature for 2 hours and then cooled. The impure product, which is not purified further, has a carboxyl functionality of 4.89 equivalents per kilogram and a Tg of 19° C. (determined by differential scanning calorimetry).

(B) Preparing an epoxy resin of the invention using the product obtained in (A).

Stage (a)

218.7 g (1.163 epoxide equivalents) of a liquid bisphenol A diglycidyl ether (epoxide equivalent weight 188) and 50.0 g (0.2445 carboxyl equivalents) of the products obtained in (A) (carboxyl equivalent weight 204.5) are placed in a 1.5 l reaction vessel with mechanical stirrer, evacuation device, reflux condenser, thermometer and temperature-controlled heating. The reaction mixture is heated to about 100° C., and 0.219 g of a solution of about 20 percent by weight N-methyl-N-ethylpiperidinium iodide in ethanol is added. The temperature is then raised to 140° C. and the mixture is left at this temperature for 30 minutes. After this time, the reaction product is found by titration to have an epoxide value of about 3.40 equivalents per kilogram.

Stage (b)

Then 50.0 g (0.439 hydroxyl equivalent) of bisphenol A are added, the temperature is raised to 180° C., and the mixture is left at this temperature for 1 hour. The product obtained accordingly (resin B1) has an epoxide equivalent weight of 662, a Mettler softening point of 86.6° C. (measured with the Mettler Thermosystem FP 800) and a Höppler viscosity of 240 mPa·s at 25° C. (40% strength in butyl-Carbitol). Its ICI melt viscosity is 12.8 poise at 150° C., and its glass transition temperature (Tg) is 41.3° C. (determined by differential scanning calorimetry).

EXAMPLE 2

Preparing an epoxy resin of the invention using a product obtained in accordance with Example 1(A) and 4-tert-butylphenol.

682.08 g (3.642 epoxide equivalents) of a liquid bisphenol A diglycidyl ether (epoxide equivalent weight 187) and 180.0 g (0.884 carboxyl equivalents) of a product obtained in accordance with Example 1(A) (carboxyl equivalent weight 204) are placed in a 1.5 l reaction vessel with mechanical stirrer, evacuation device, reflux condenser, thermometer and temperature-controlled heating. The reaction mixture is heated to about 100° C., and about 0.34 g of a solution of about 20 percent by weight N-methyl-N-ethylpiperidinium iodide in ethanol is added. The temperature is then raised to 140° C. and the mixture is left at this temperature for 60 minutes. After this time, the reaction product is found by titration to have an epoxide value of about 3.22 equivalents per kilogram. Then 10 g (0.0667 hydroxyl equivalent) of 4-tert-butylphenol and 127.92 g (1.122 hydroxyl equivalents) of bisphenol A are added, the temperature is raised to 165° C., and the mixture is left at this temperature for 2 hours. The product obtained accordingly (resin B2) has an epoxide equivalent weight of 649, a Mettler softening point of 82.9° C. (measured with the Mettler Thermosystem FP 800) and a Höppler viscosity of 212 mPa·s at 25° C. (40% strength in butyl-Carbitol). Its ICI melt viscosity is 11.2 poise at 150° C.

EXAMPLE 3

(A) Preparing a compound of the formula (I) by reacting 1,4-dimethylolcyclohexane with hexahydrophthalic anhydride.

In a reaction vessel with mechanical stirrer, nitrogen blanketing and thermometer, 400.0 g (2.594 mol) of cis-hexahydrophthalic anhydride and 187.09 g (1.297 mol) of 1,4-dimethanolcyclohexane are heated under nitrogen to a temperature of 70° C. Owing to the exothermic reaction which ensues, the internal temperature of the vessel rises to 154° C. The reaction temperature is raised to 157° C. and the mixture is left at this temperature for about 1.5 hours and then cooled. The impure product, which is not purified further, has a carboxyl functionality of 4.42 equivalents per kilogram and a Tg of 33.4° C. (determined by differential scanning calorimetry).

(B) Preparing an epoxy resin of the invention using the product obtained in (A).

686.08 g (3.671 epoxide equivalents) of a liquid bisphenol A diglycidyl ether (epoxide equivalent weight 187) and 150.0 g (0.663 carboxyl equivalent) of the product obtained in (A) (carboxyl equivalent weight 226) are placed in a 1.5 l reaction vessel with mechanical stirrer, evacuation device, reflux condenser, thermometer and temperature-controlled heating. The reaction mixture is heated to about 100° C., and 0.129 g of a solution of about 40 percent by weight N-methyl-N-ethylpiperidinium iodide in water is added. The temperature is then raised to 140° C. and the mixture is left at this temperature for 15 minutes. After this time, the reaction product is found by titration to have an epoxide value of about 3.81 equivalents per kilogram. Then 163.92 g (1.438 hydroxyl equivalents) of bisphenol A are added, the temperature is raised to 165° C., and the mixture is left at this temperature for 2 hours and 20 minutes. The product obtained accordingly (resin B3) has an epoxide equivalent weight of 649, a Mettler softening point of 86.7° C. (measured with the Mettler Thermosystem FP 800) and a Höppler viscosity of 242 mPa·s at 25° C. (40% strength in butyl-Carbitol). Its ICI melt viscosity is 14.8 poise at 150° C., and its glass transition temperature (Tg) is 43.4° C.

EXAMPLE 4

(A) Preparing a compound of the formula (I) by reacting 1,4-cyclohexanediol with hexahydrophthalic anhydride.

In a reaction vessel with mechanical stirrer, nitrogen blanketing and thermometer, 400.0 g (2.594 mol) of cis-hexahydrophthalic anhydride and 150.69 g (1.297 mol) of 1,4-cyclohexanediol are heated under nitrogen to a temperature of 130° C. (temperature in the reaction vessel). Owing to the exothermic reaction which ensues, the internal temperature of the vessel rises to about 153° C. The reaction temperature is raised to 156° C. and the mixture is left at this temperature for about 1.5 hours and then cooled. The impure product, which is not purified further, has a carboxyl functionality of 4.81 equivalents per kilogram and a Tg of 41.6° C. (determined by differential scanning calorimetry).

(B) Preparing an epoxy resin of the invention using the product obtained in (A).

690.23 g (3.693 epoxide equivalents) of a liquid bisphenol A diglycidyl ether (epoxide equivalent weight 187) and 150.0 g (0.722 carboxyl equivalent) of the product obtained in (A) (carboxyl equivalent weight 208) are placed in a 1.5 l reaction vessel with mechanical stirrer, evacuation device, reflux condenser, thermometer and temperature-controlled heating. The reaction mixture is heated to about 100° C., and 0.129 g of a solution of about 40 percent by weight N-methyl-N-ethylpiperidinium iodide in water is added. The temperature is then raised to 140° C. and the mixture is left at this temperature for 15 minutes. After this time, the reaction product is found by titration to have an epoxide value of about 3.91 equivalents per kilogram. Then 159.77 g (1.401 hydroxyl equivalents) of bisphenol A are added, the temperature is raised to 165° C., and the mixture is left at this temperature for about 2 hours and 20 minutes. The product obtained accordingly (resin B4) has an epoxide equivalent weight of 658, a Mettler softening point of 91.0° C. (measured with the Mettler Thermosystem FP 800) and a Höppler viscosity of 254 mPa·s at 25° C. (40% strength in butyl-Carbitol). Its ICI melt viscosity is 21.2 poise at 150° C., and its glass transition temperature (Tg) is 47.5° C.

EXAMPLE 5

Preparing an epoxy resin of the invention using a pre-advanced diglycidyl ether resin which is the reaction product of a compound of the formula (I) based on neopentyl glycol and sebacic acid with bisphenol A diglycidyl ether and which has has an epoxy functionality of 2.23 equivalents per kilogram and a Tg of −30° C. (determined by differential scanning calorimetry).

Stage (a)

107.85 g (0.241 epoxy equivalents) of the product defined more closely in the title are placed in a 1.5 l reaction vessel with mechanical stirrer, evacuation device, reflux condenser, thermometer and temperature-controlled heating and are dispersed in this vessel in 640.51 g (3.427 epoxide equivalents) of a liquid bisphenol A diglycidyl ether (epoxide equivalent weight 187).

Stage (b)

The dispersion obtained according to (a) is heated to about 100° C., and 251.64 g (2.209 hydroxyl equivalents) of bisphenol A and about 0.8 g of the solution of about 20% by weight N-methyl-N-ethylpiperidinium iodide in ethanol are added. The temperature is then raised to 178° C. and the mixture is left at this temperature for 2 hours. The product obtained (resin B5) has an epoxide equivalent weight of 714, a Mettler softening point of 88.8° C. (measured with Mettler Thermosystem FP 800) and a Höppler viscosity of 410 mpa·s at 25° C. (40% strength in butyl-Carbitol). Its ICI melt viscosity is 23.6 poise at 150° C. and its glass transition temperature Tg is 38.8° C.

EXAMPLE 6

To produce a powder coating composition the substances indicated below are mixed in the stated amount:

| Substance | Amount [g] | |
|---|---|---|
| Resin B1 | 36.94 | (0.056 eq. epoxide) |
| Crylcoat ®350[1] | 58.06 | (0.062 eq. COOH) |
| Araldit ®GT 3032[2] | 5.00 | (0.006 eq. epoxide) |
| Titanium dioxide pigment[3] | 50.00 | |
| Benzoin | 0.30 | |

[1] Polyester resin from UCB with 1.06 carboxyl equivalents per kilogram.
[2] Araldit GT 3032, a modifier for the surface tension of powder coating materials, containing 90% by weight of a difunctional epoxy resin (1.27 epoxide equivalents per kilogram of modifier).
[3] TiO$_2$ pigment R-kb-2 from Bayer.

The resulting mixture is homogenized further at 110° C. with melting in a twin-screw extruder (PRISM TSE 16 PC). The extrudate is cooled on a cooling roll, broken into lumps and then milled with a Retch centrifugal mill to a fine powder which is finally passed through a sieve with a mesh size of 100 μm. The gel time (in accordance with ISO 8130) of the powder coating material is 4 min 35 s at 180° C. Using an electrostatic spray gun from ESB, the powder is applied to Q-panels in a thickness of 0.8 mm. The panels are heated in an oven at 200° C. for 15 minutes in order to melt and cure the coating. A coating with a thickness of 60 μm is obtained which has the following properties:

| | |
|---|---|
| Erichsen coupling test[4] [mm] | 9.7 |
| Impact deformation; d[5] [cm kg] | >160 |
| Acetone test[6] | 3 |
| Gloss 60°/20° [%] | 98/93 |

[4] in accordance with DIN 53156.
[5] The impact deformation d (direct) is determined by dropping a die weighing 2 kg with a 20 mm diameter ball on its underside directly onto the coated surface from a defined height with the underside foremost. The value stated is the product of the weight of the die, in kg, and the test height, in cm, at which there is still no perceptible damage to the coating.
[6] in accordance with DIN 53320. The sample is kept in acetone for 1 minute. The result is assessed in accordance with the following five-point scale: 0 = unchanged; 1 = limiting, not scratchable with the fingernail; 2 = difficult to scratch, pad possibly coloured; 3 = softens, readily scratchable; 4 = beginning of detachment or dissolution; 5 = complete dissolution.

EXAMPLE 7

To produce a powder coating composition the substances indicated below are mixed in the stated amount:

| Substance | Amount [g] | |
|---|---|---|
| Resin B2 | 94.88 | (0.146 eq. epoxide) |
| Joncryl ®SCX 819[8] | 105.12 | (0.146 eq. COOH) |
| Modaflow ®III[9] | 3.60 | |
| Actiron ®NXJ 60[10] | 0.40 | |
| Titanium dioxide pigment[3] | 100.00 | |
| Benzoin | 0.60 | |

[8] (Meth)acrylic resin from S.C. Johnson Polymer with a molecular weight (weight average Mw of 719) and with 1.39 carboxyl equivalents per kilogram.
[9] Acrylate copolymer on silica support, flow agent from Monsanto.
[10] 100% 2-propylimidazole from Protex Chemie.

The mixture is homogenized further at 90° C. with melting in a twin-screw extruder (PRISM TSE 16 PC). The extrudate is cooled on a cooling roll, broken into lumps and then milled with a Retch centrifugal mill to a fine powder which is finally passed through a standard sieve with a mesh size of 75 μm. The resulting powder has a particle size of less than 75 μm. Using an electrostatic spray gun from ESB, the powder is applied to Q-panels in a thickness of 0.8 mm. The panels are heated in an oven at 190° C. for 30 minutes in order to melt and cure the coating. A coating with a thickness of 50 μm is obtained which has the following properties:

| | |
|---|---|
| Erichsen coupling test[4] [mm] | 9.7 |
| Impact deformation; d[5] [cm kg] | >140 |
| Acetone test[6] | 2 |
| Gloss 60°/20° [%] | 97/89 |

What is claimed is:
1. A heat-curable composition which comprises
(I) an epoxy resin obtained by
(a) first reacting
(A1) at least one substance selected from the substances of the formula (I) and of the formula (II):

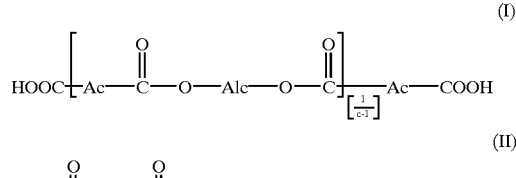

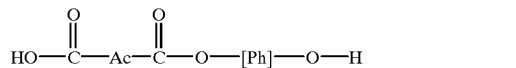

in which
Alc is the radical of a diol which has been freed from its hydroxyl groups and comprises 2 to 20 carbon atoms,
Ac is the radical of a dicarboxylic acid which has been freed from its carboxyl groups and comprises 2 to 20 carbon atoms,
[Ph] is the radical of a difunctional phenolic compound which has been freed from its phenolic hydroxyl groups and has 6 to 20 carbon atoms, and
c is a number greater than 1 but not more than 2, with
(A2) at least one liquid diglycidyl ether based on a first bisphenol compound in an amount chosen so that there are more than two equivalents of glycidyl groups of component (A2) for a total of one equivalent of carboxyl and phenolic hydroxyl groups of component (A1), a pre-advanced diglycidyl ether resin is formed in dispersion in the liquid diglycidyl ether of which there is at least one, and (b) subsequently reacting the resin dispersion obtained in accordance with (a) with a phenol component comprising at least one bisphenol compound which is identical to or different from the first bisphenol compound, the amount of the phenol component being chosen so that in the mixture of the resin dispersion and the phenol component the glycidyl groups prior to the reaction are in a stoichiometric excess over the phenolic hydroxyl groups; and a (meth)acrylate polymer containing free carboxyl groups or polyester polymer containing free carboxyl groups.

2. A powder coating material which comprises the heat-curable composition of claim 1, wherein in stage (b) only a bisphenol compound is used.

3. A heat-curable composition according to claim 1, wherein in stage (a)

Alc is the radical, freed from its hydroxyl groups, of a diol selected from the group consisting of aliphatic diols having 2 to 18 carbon atoms and diols having 6 to 20 carbon atoms, and containing one or more cycloaliphatic groups;

Ac is the radical, freed from its carboxyl groups, of a dicarboxylic acid selected from divalent aliphatic radicals having 2 to 18 carbon atoms, and radicals having 6 to 20 carbon atoms and containing one or more cycloaliphatic groups; and

[Ph] is the radical, freed from its phenolic hydroxyl groups, of a difunctional phenolic compound having 6 to 20 carbon atoms.

4. A heat-curable composition according to claim 1, wherein in stage (a) component (A1) is a compound of the formula (I).

5. A heat-curable composition according to claim 4, wherein

Alc corresponds to a radical selected from the group consisting of the $C_2$–$C_6$alkanediyl radicals and of diols having 6 to 10 carbon atoms and comprising a cyclohexane ring, and Ac corresponds to a cyclohexanediyl radical.

6. A heat-curable composition according to claim 1, wherein at least stage (b) is carried out in the presence of an advancement catalyst.

7. A heat-curable composition according to claim 1, wherein in stage (b) the phenol component additionally comprises a monophenol.

8. A powder coating material which consists of a curable composition according to claim 1.

* * * * *